(12) United States Patent
Aldereguia et al.

(10) Patent No.: US 7,523,365 B2
(45) Date of Patent: Apr. 21, 2009

(54) DYNAMIC DETERMINATION OF SIGNAL QUALITY IN A DIGITAL SYSTEM

(75) Inventors: Alfredo Aldereguia, Cary, NC (US); Marcus Alan Baker, Apex, NC (US); Justin Potok Bandholz, Cary, NC (US); Jeffrey Buchanan Williams, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 11/305,932

(22) Filed: Dec. 19, 2005

(65) Prior Publication Data

US 2007/0143644 A1     Jun. 21, 2007

(51) Int. Cl.
*G01R 31/28* (2006.01)
*G06F 11/00* (2006.01)
*G11B 27/00* (2006.01)
*H04B 3/46* (2006.01)

(52) U.S. Cl. .................. 714/712; 714/798; 714/819; 375/224

(58) Field of Classification Search .................. None
See application file for complete search history.

(56) References Cited

U.S. PATENT DOCUMENTS

| | | | |
|---|---|---|---|
| 4,542,514 A | 9/1985 | Watanabe | 375/10 |
| 5,578,938 A | 11/1996 | Kazami | 326/16 |
| 5,581,228 A * | 12/1996 | Cadieux et al. | 340/146.2 |
| 5,799,049 A | 8/1998 | McFarland et al. | 375/362 |
| 5,838,659 A | 11/1998 | Kainulainen | 370/216 |
| 6,037,809 A | 3/2000 | Wodnicki et al. | 327/77 |
| 6,163,551 A | 12/2000 | Wolf | 370/503 |
| 6,246,275 B1 | 6/2001 | Wodnicki et al. | 327/291 |
| 6,384,649 B1 | 5/2002 | Boerstler et al. | 327/156 |
| 6,477,659 B1 | 11/2002 | Ho | 713/503 |
| 6,580,775 B1 | 6/2003 | Park et al. | 375/375 |
| 6,606,354 B1 | 8/2003 | Bach et al. | 375/224 |
| 6,618,455 B1 | 9/2003 | Maeda et al. | 375/354 |

(Continued)

FOREIGN PATENT DOCUMENTS

WO    WO 91/10951    7/1991

OTHER PUBLICATIONS

Kohler et al., "Clock Skew Aligner," *IBM Technical Disclosure Bulletin*, vol. 35, No. 1A, pp. 284-287 (1992).

*Primary Examiner*—Christine T Tu
(74) *Attorney, Agent, or Firm*—John Biggers; Cynthis G. Seal; Biggers & Ohanian LLP

(57) ABSTRACT

A receiving processor is configured with a normal (operational) path and a test path. The test path is configured in parallel with the normal path. The test path simulates and receives as input the same data as the normal path, but the test path has a separate voltage reference ($V_{ref\_test}$) which is applied to a test input buffer. The same data input to normal buffer is also input to the test buffer. The output of the test buffer is input to a test latch. A clocking signal supplied to the test latch is a variable clocking signal enabling the clock signal to be skewed selectively. The output of the test latch is compared with the output of the normal latch, and differences between the two output signals defines an error for a particular voltage/clock-skew combination.

8 Claims, 2 Drawing Sheets

U.S. PATENT DOCUMENTS 6,687,844 B1    2/2004  Zhang ........................ 713/503
6,898,741 B2 *  5/2005  Muljono et al. ............. 714/700
6,914,884 B2 *  7/2005  Matsuo et al. .............. 370/249

* cited by examiner

DYNAMIC DETERMINATION OF SIGNAL QUALITY IN A DIGITAL SYSTEM

BACKGROUND OF THE INVENTION

1. Field of the Invention

The present invention relates in general to determining signal quality in a digital system and, more particularly, to determining signal quality of clocked signals applied to a chip receiver.

2. Description of the Related Art

In processing systems (e.g., computers, handheld devices, etc.) the signal quality of synchronous signals must be in compliance with the specifications of the device. Such signals are commonly found in busses where the signals must arrive at their final destination point together and are sampled by a common clock. If the signal quality is not in compliance with the device specifications, the device will typically signal a parity error or other error type, and this typically causes a system reboot or requires the retransmission of data.

Measurement of high speed signals in the prior art utilize a voltage reference to determine when the receiver sees a high or low reference. Chip vendors will typically specify a minimum setup time and minimum hold time at which the vendor will guarantee that the device will operate properly. Oscilloscope images are visually compared to specifications to determine if there is sufficient set-up and hold time at the specified voltage levels.

It is typical to test the signal quality of a system before the system is made available to a consumer, and/or during system start-up when the system is actually in use. The set-up, hold, rise, and fall times of the signals are usually measured with an oscilloscope referenced to the receiving clock and the signal pad of the component being tested. This measuring process can take days or weeks to accomplish, especially when some chips have greater than 1,000 signals which must be measured.

SUMMARY OF THE INVENTION

A receiving processor is configured with a normal (operational) path and a test path. In the normal path a reference voltage is applied to a normal (operational) buffer, to which the data input signal is also applied. The output of the normal buffer is applied to the input of a normal (operational) latch. A fixed clock signal is also applied to the latch which triggers the output of the data signal from the normal latch to the output of the chip. The test path is configured in parallel with the normal path. The test path simulates and receives as input the same data as the normal path, but the test path has a separate voltage reference ($V_{ref\_test}$) which is applied to a test input buffer. The same data input to normal buffer is also input to the test buffer. The output of the test buffer is input to a test latch. A clocking signal supplied to the test latch is a variable clocking signal enabling the clock signal to be skewed selectively. The output of the test latch is compared with the output of the normal latch, and differences between the two output signals defines an error for a particular voltage/clock-skew combination.

DETAILED DESCRIPTION OF THE PREFERRED EMBODIMENTS

Figure 1:
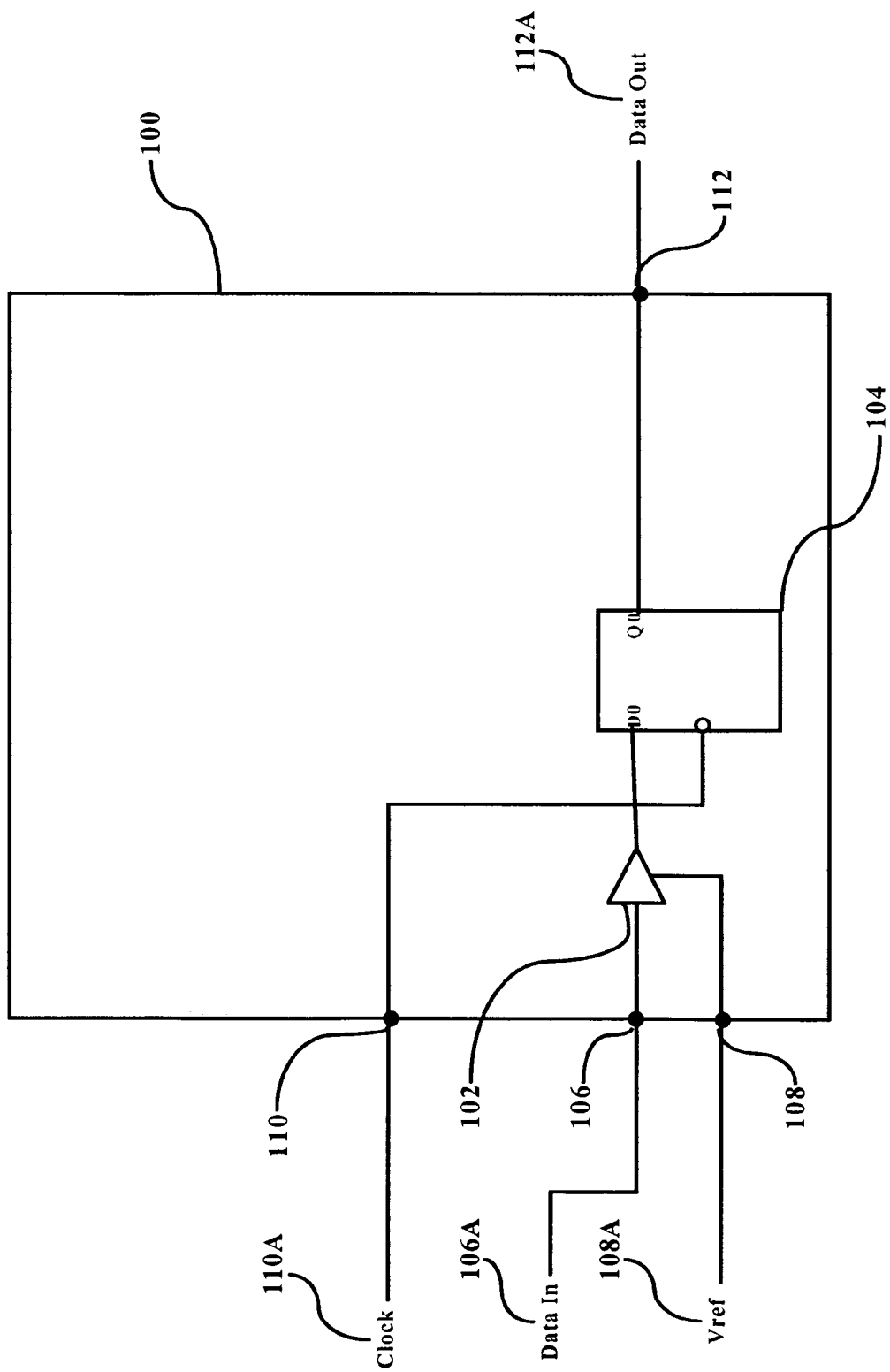
FIG. 1 illustrates a prior art receiving processor.

FIG. 1 illustrates a prior art receiving processor, also known as a receiving chip. In this example, the receiving processor comprises a VLSI chip, although the present invention is not limited to a VLSI chip and can comprise any device in which a clocked signal is applied to a chip receiver. VLSI chip 100 includes an input buffer 102 and a latch 104. A data input signal 106A is received by input buffer 102 via data signal input point 106. A reference voltage $V_{ref}$ 108A is input via reference voltage input point 108 and triggers the output of data stored in input buffer 102 in a well known manner. Latch 104 receives a clock signal 110A. Buffered incoming data signal 106A applied to the D0 input of latch 104 is output via output Q0 triggered by the clock signal 110A, in a well known manner. This data is output from the VLSI chip 100 via data output point 112 as data output signal 112A. FIG. 1 illustrates only the input-signal processing aspects of VLSI chip 100; as is well known, VLSI chip 100 will also typically include hundreds or thousands of electronic components on the chip. Typically, data output signal 112A would be input to one or more of these components.

As is well known, the input buffer 102 establishes the voltage at which the VLSI chip 100 will determine a "high" or a "low" signal. $V_{ref}$ 108A is the voltage reference. $V_{ref}$ 108A is used by the VLSI 100 chip to calculate the minimum voltage level needed by a "data in" signal 106A to be considered a logical "1" by the chip 100. Likewise, $V_{ref}$ 108A is also used to calculate the maximum voltage a "data in" 106A signal can have and still be considered a logical "0" by the VLSI chip 100. It also buffers the signal for loading within the VLSI chip, thereby "cleaning up" noise on the signal prior to its entering the VLSI chip 100.

The latch 104 latches the incoming data signal, based on the clock signal 110. Typically in high-speed designs this must be done, as there is not sufficient set-up and hold-time to go through logic, and the signal is referenced by the clock signal. The data-output signal 112A of latch 104 is the actual data signal used by the components (internal logic) within the VLSI chip 100. By latching the signal, the VLSI chip 100 is essentially extending the hold time. This allows the internal logic of VLSI chip 100 more time to perform any necessary operations on the signal prior to its changing, and gives the chip designer the ability to meet high speed design requirements.

Figure 2:
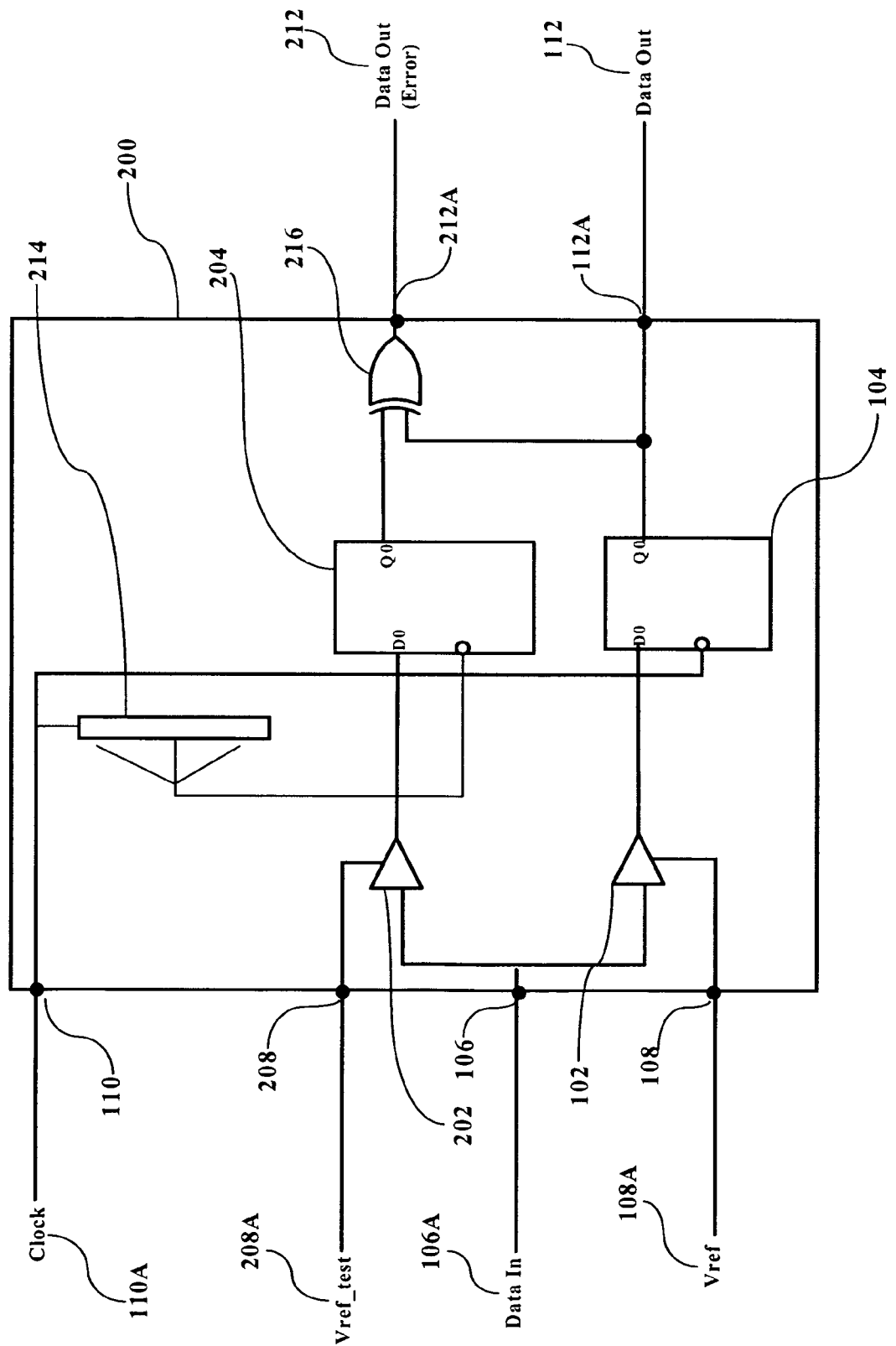
FIG. 2 is a block diagram of a processor employing the method and structure of the present invention.

FIG. 2 is a block diagram of a processor (again a VLSI chip in this example) employing the method and structure of the present invention. Referring to FIG. 2, a VLSI chip 200 includes an input buffer 102, a latch 104, a clock signal 110A input via clock signal input point 110 to the latch 104, a data input signal 106A, and a $V_{ref}$ signal 108A, input via $V_{ref}$ signal input point 108. This structure is essentially identical to the prior art structure of FIG. 1. However, in accordance with the present invention, a test path, comprising test input buffer 202, test input latch 204, clock skew circuit 214, and exclusive-or gate 216 are also included in the VLSI chip 200.

The functions and operations of the elements of FIG. 2 that are similar to that of FIG. 1 are essentially the same. Data is input to the buffer 102 and is latched by latch 104, based on the clock signal 110A, to be output from the VLSI chip 200. The test path, however, allows testing to be performed on the exact same data signal that is being used by the normal path, without affecting the data output signal 112A. More specifically, test buffer 202 is used only during testing to determine voltage sensitivity. $V_{ref\_test}$ 208A, input via $V_{ref\_test}$ input point 208, is varied when performing tests. If $V_{ref\_test}$ 208A is varied too high or too low, an error condition will be simulated. By identifying the high voltage and low voltage at which an error condition occurs, the sensitivity range of the VLSI chip 200 can be determined. The test input latch 204 has the same function as normal input latch 104 but is used only for testing purposes. As described in more detail below, the output of the test input latch 204 is compared to the output of the normal input latch 104 using exclusive-or gate 216. If there is any difference output by exclusive-or gate 216, an error is implied.

Clock skew circuit 214 allows the clock signal 110A applied to test input latch 204 to be selectively skewed either in the positive or negative direction. Methods and circuits for skewing clock signals are well known to ASIC designers and any method for performing the skewing function will suffice for purposes of the present invention. The output of clock skew circuit 214 is input to the test input latch 204 but not to the input latch 104. By skewing the clock signal input to test input latch 204 and comparing the test latch data signal latched by test input latch 204 with the real data signal output from input latch 104, it can be determined how much margin there is in the clock signal, i.e., how much skew can be put on the clock before an error occurs. Exclusive-OR gate 216 compares the normal output 104 to the test output 204 to determine if the parameters are skewed beyond the point of providing correct data. This point will be the value (point) at which failures begin, and there is both a high point and a low point where data will become incorrect. As is well known, an exclusive OR gate will only output a logical "1" if the two inputs to the gate differ. An output of logical "1" from exclusive OR gate 216 indicates that the outputs from normal output 104 and test output 204 disagree, indicating an error condition.

With the present invention, the test path allows a simulation of the actual data path without affecting the chip function. The same data as is used in the regular path is used in the test path, but voltage references can be changed and clock skew can be added without affecting the chip function. This allows testing to be performed at any time, even during normal operation of the chip. While regular data is being run through the processor, "four corners" and margins can also be viewed. The high voltage, low voltage, and clock skew with those voltages can be viewed and it is possible to get a good idea of how good or bad the eye pattern is. The real data is data output signal 112A. This real data is delivered to the internal logic of the VLSI chip to be used for its intended purpose. The test data output signal 212A is an error signal output from the chip and is used to alert test equipment (not shown) to the occurrence of an error. This same test equipment will also provide adjustments to $V_{ref\_test}$ signal 208A and skew signal from clock skew circuit 214 to determine the $V_{ref}$ and skew margins. The eye pattern describes the skew window that will still create valid data, or the $V_{ref}$ skew (margining) that will maintain valid data. The four corners of the eye pattern delineate the largest window of a $V_{ref}$ margin with a clock skew that could be used and still maintain valid data (min-$V_{ref}$+max negative clock skew; max-$V_{ref}$+max negative clock skew; min-$V_{ref}$+max positive clock skew; and max-$V_{ref}$+max positive clock skew define the four corners).

To conduct a test in the prior art, to measure the voltage margins it is required to change the $V_{ref}$ signal 108A and then increment the $V_{ref}$ signal 108A until a point at which the system fails. This requires changing the actual data flow; the system will fail and then it will be known that the failure point (the value of $V_{ref}$ at the point of failure) is one limit for the window. The oscilloscope is placed at the normal data output point 112, and the value of $V_{ref}$ is changed multiple times until a window is identified for the failures. This process is performed for each input, because it is being done on the actual path, in order to get a window as to where it fails. In other words, the actual data is changed to a point at which it actually fails, which shuts the entire system down. For this reason, prior art testing is typically performed when the VLSI chip (or other processor being tested) is off-line.

Using the system of the present invention, the $V_{ref\_test}$ signal 208A can be changed by any amount desired, and as many times as desired, without affecting the data output signal 112A. The $V_{ref\_test}$ signal 208A is simply skewed until an error occurs, which provides a data point. This allows the VLSI chip (or any other processor using the present invention) to have signal testing performed on it while it is in service and functioning.

It will be understood that elements of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

The above-described steps can be implemented using standard well-known programming techniques. The novelty of the above-described embodiment lies not in the specific programming techniques but in the use of the steps described to achieve the described results. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A processor configured to receive digital signals, comprising:

a normal path receiving a data input signal and outputting a normal data output signal to be processed by said processor; and a test path receiving said data input signal and outputting a test data output signal, said test path being utilized to test the signal quality of said data input signal without affecting said normal data output signal, wherein said test path comprises:
  a test input latch receiving said data input signal and outputting said test data output signal; and
  a variable test reference voltage input to said test input latch, wherein varying said test reference voltage affects the value of said test data output signal.

2. The processor of claim 1, wherein said test path comprises:
  a clock skew circuit operatively coupled to said test input latch and receiving a clock signal, said clock skew circuit enabling said clock signal received by said clock skew circuit to be selectively skewed in the positive or negative direction, thereby affecting the value of said output test data signal.

3. The processor of claim 2, wherein said normal path comprises a normal input latch receiving said input data signal and said clock signal and outputting said normal output data signal, and wherein said processor further comprises:
  comparison means comparing said test data output signal and said normal data output signal, said comparison means outputting a first value if said comparison indicates an error condition in said test data output signal and a second value if said comparison indicates a non-error condition in said test data output signal.

4. The processor of claim 3, wherein said comparison means comprises an Exclusive-OR gate connected to receive said test data output signal and said normal data output signal.

5. A method for determining the quality of received digital signals, comprising:
  providing a normal path for receiving a data input signal and outputting a normal data output signal to be processed by said processor; and
  providing a test path receiving said data input signal and outputting a test data output signal, said test path being utilized to test the signal quality of said data input signal without affecting said normal data output signal, wherein providing said test path comprises:
    providing a test input latch receiving said data input signal and outputting said test data output signal; and
    a variable test reference voltage input to said test input latch, wherein varying said test reference voltage affects the value of said test data output signal.

6. The method of claim 5, wherein said providing of a test path comprises:
  providing a clock skew circuit operatively coupled to said test input latch and receiving a clock signal, said clock skew circuit enabling said clock signal received by said clock skew circuit to be selectively skewed in the positive or negative direction, thereby affecting the value of said output test data signal.

7. The method of claim 6, wherein said providing of said normal path comprises providing a normal input latch receiving said input data signal and said clock signal and outputting said normal output data signal, and wherein said processor further comprises:
  providing comparison means for comparing said test data output signal and said normal data output signal, said comparison means outputting a first value if said comparison indicates an error condition in said test data output signal and a second value if said comparison indicates a non-error condition in said test data output signal.

8. The method of claim 7, wherein said comparison means comprises an Exclusive-OR gate connected to receive said test data output signal and said normal data output signal.

* * * * *